Jan. 31, 1956     A. G. GURRIES ET AL     2,732,782
REVERSIBLE DISC PLOW
Filed April 27, 1953     5 Sheets-Sheet 4
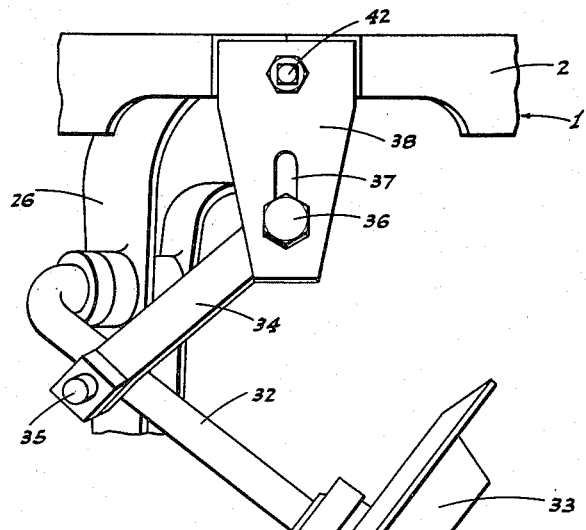
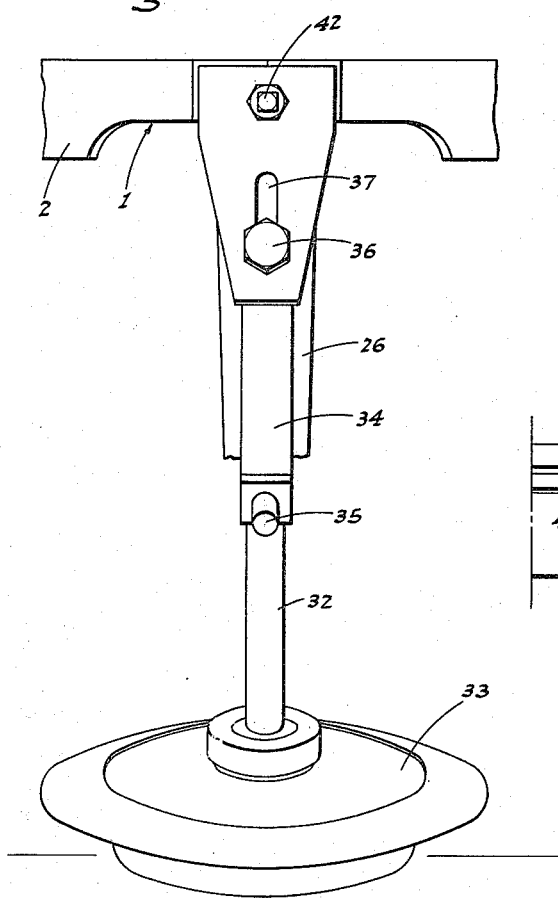
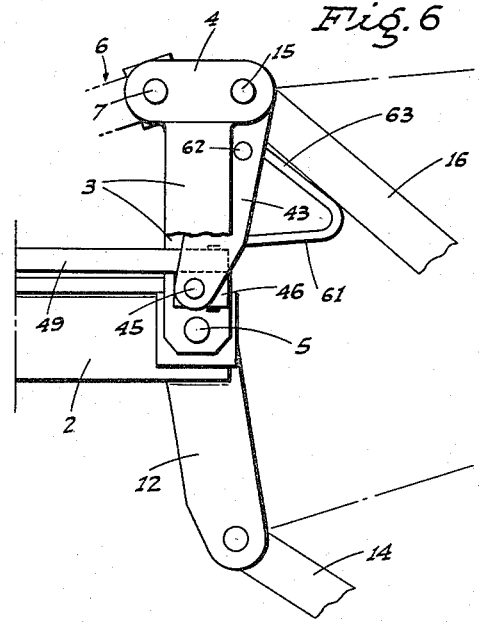
INVENTORS
A.G. Gurries
E.J. Rimple
BY
ATTYS

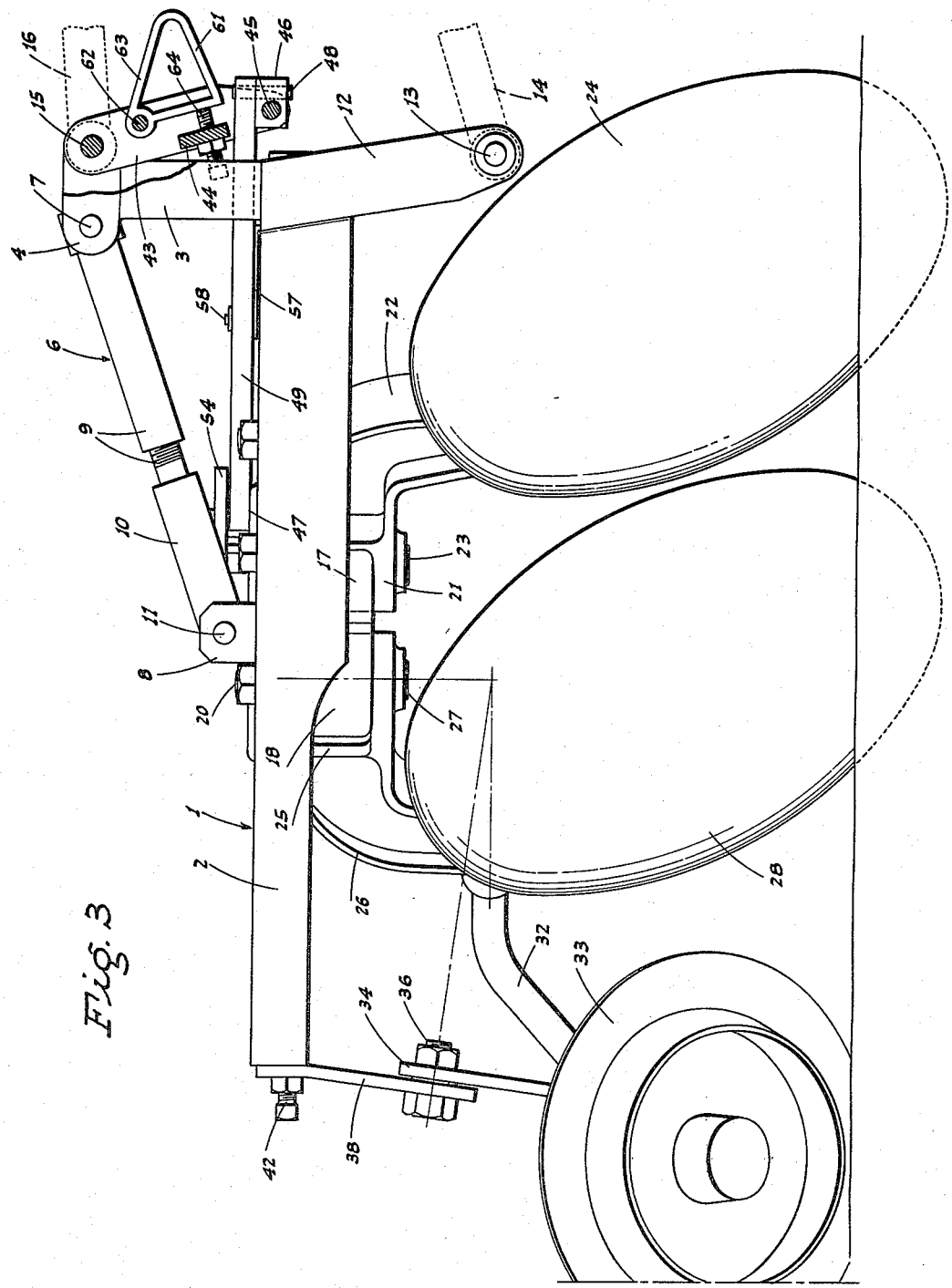

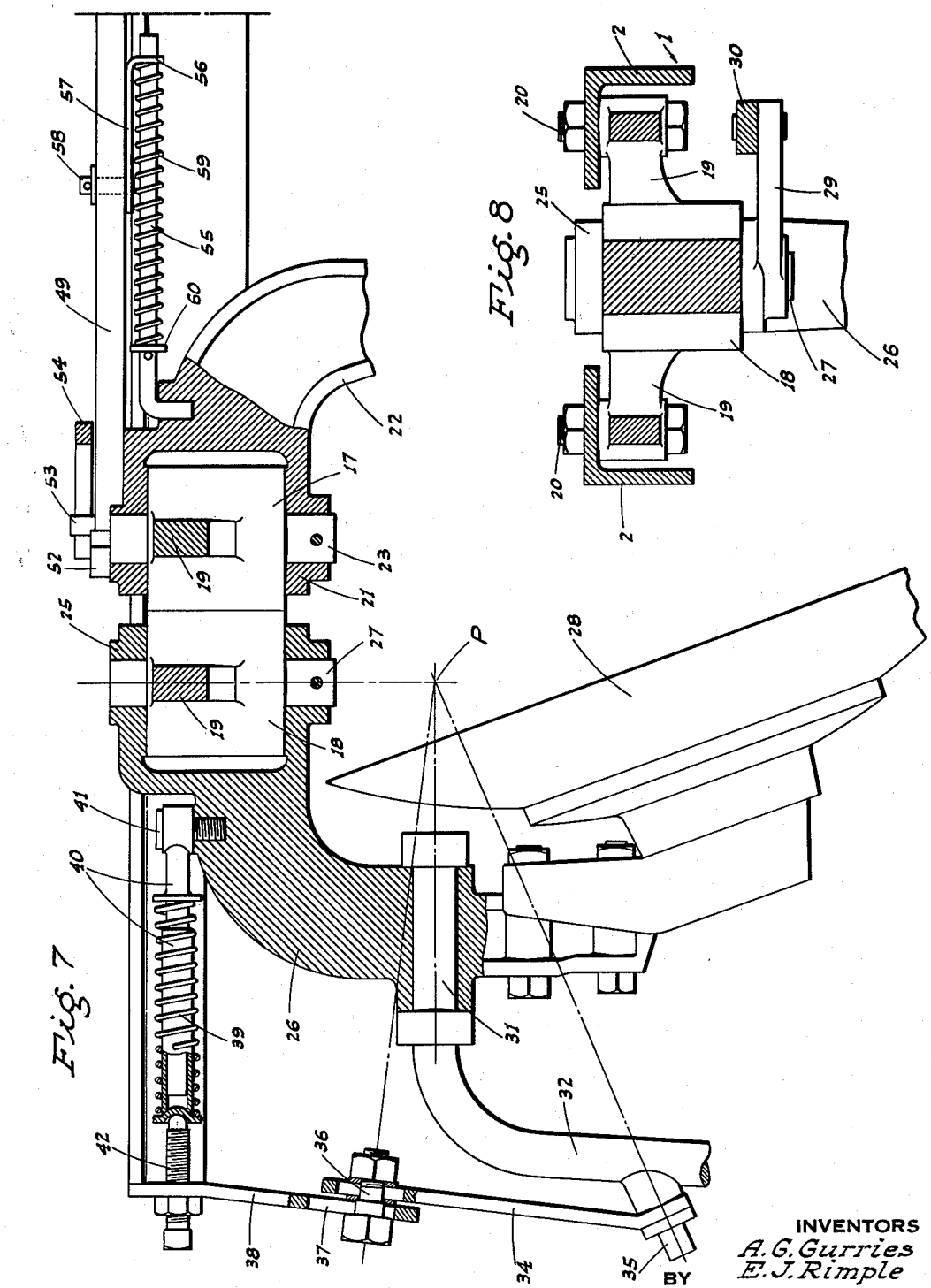

United States Patent Office 2,732,782
Patented Jan. 31, 1956

2,732,782

REVERSIBLE DISC PLOW

Albert G. Gurries and Edward J. Rimple, Gilroy, Calif., assignors to Be-Ge Manufacturing Co., Gilroy, Calif., a corporation of California Application April 27, 1953, Serial No. 351,434

10 Claims. (Cl. 97—32)

This invention relates to a disc plow of the type arranged to be connected to the liftable draft bars of a tractor so that when the bars are raised the entire plow is raised clear of the ground.

One object of the present invention is to provide a disc plow having a frame, and a pair of plowing discs and a furrow wheel mounted thereon in such a manner that when the discs and wheel are raised clear of the ground, they may be readily swung from a right hand to a left hand plowing position, and vice versa.

A further and important object is to provide an actuating device for the swingable discs including a member disposed relative to one of the tractor-mounted draft and lift bars so that said member will be in the path of said bar when the plow structure is lifted, and arranged so that the plows and wheel will be swung from one position to the other after the lifting proceeds beyond a mere ground clearing position of the plows.

Another object is to provide means whereby the actuating device may be readily rendered inoperative, without removing or disconnecting any parts, when it is desired to maintain the discs constantly in one operating position and without preventing the lifting of the plow structure as may be necessary during plowing operations.

Still another object of the invention is to provide a disc plow which is practical, reliable, and durable, and one which is exceedingly effective for the purpose for which it is designed.

These objects are accomplished by means of such structure and relative arrangement of parts as will fully appear by a perusal of the following specification and claims.

In the drawings:

Fig. 3 is a side elevation of the plow, with the parts in the position of Fig. 1.

Fig. 4 is a fragmentary rear end elevation showing the furrow wheel in its lowered right-hand position.

Fig. 5 is a similar view, but showing the furrow wheel in the intermediate position occupied when the plow structure is lifted to clear the discs from the ground.

Fig. 6 is a fragmentary side elevation, partly broken away, of the forward portion of the disc shifting device as engaged and actuated by the upper draft bar of the tractor.

Fig. 7 is a fragmentary enlarged sectional elevation of the structure with the movable parts in their intermediate or longitudinally alined position.

Fig. 8 is a fragmentary enlarged cross section on line 8—8 of Fig. 2.

Figure 1:
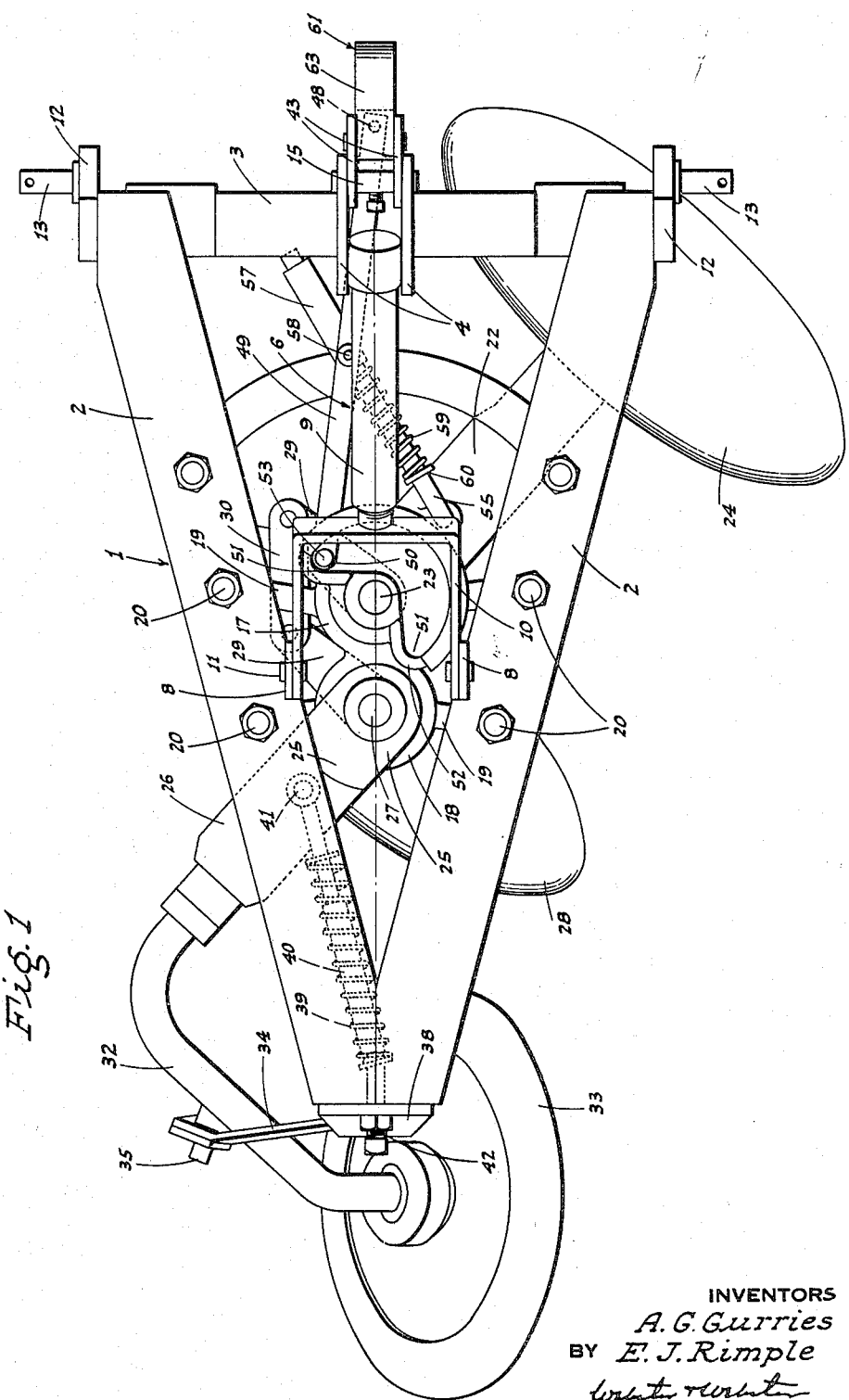
Fig. 1 is a plan view of the structure showing the discs and furrow wheel in a right-hand plowing position.

Referring now more particularly to the characters of reference on the drawings, the plow structure includes a main frame 1 which comprises a pair of inverted and inwardly facing angle beams 2 disposed in forwardly diverging V-shaped relation.

Transversely spaced arms 3 upstand from the forward end of the beams 2; said arms including transversely spaced longitudinal members 4 at their upper ends. Arms 3 are pivoted at their lower ends, as at 5 (see Fig. 6), and are adjustably braced from the main frame by a diagonal brace unit 6 extending between a cross pin 7 on members 4 at their rear ends and brackets 8 on the beams 2 intermediate their ends. The brace unit comprises a longitudinally adjustable forward portion 9 and a rear yoke 10 connected to pins 11 on the brackets.

Other arms 12, rigid with the beams 2, depend from the forward end thereof and at their lower ends carry lateral pins 13 engaged by the rear ends of the lower draft and lift bars 14 of a tractor in the usual manner. The members 4, at their upper ends, support a cross pin 15 on which the upper link or bar 16 of the tractor-mounted mechanism is pivoted.

Disposed between the beams 2 intermediate their ends are closely spaced front and rear bosses 17 and 18 having lateral wings 19 extending under the top flanges of the beams and secured thereto by bolts 20 (see Fig. 8). The fork 21 of a depending standard 22 straddles boss 17 and is turnably mounted on the boss by a spindle 23. A plow disc 24 is mounted in the usual manner on the lower end of standard 22 on the forward face of the same.

The fork 25 of a depending standard 26 straddles boss 18 and is turnably mounted on said boss by a spindle 27.

A plow disc 28 is mounted in the usual manner on the lower end of standard 26 on the forward face of the same as shown in Fig. 7. The lower ends of standards 22 and 26 are disposed forwardly and rearwardly respectively of their mounting spindles 23 and 27 so that the discs are spaced apart lengthwise of the structure.

The forks are connected so that the discs—and the upper portion of their standards—are always maintained in parallel relation by radial arms 29 projecting from one side thereof below the bosses and their wings 19 (see Fig. 8) and linked together at their outer end by a bar 30. The arms 29 themselves are parallel to the transverse median line of the discs, as clearly shown in Figs. 1 and 2.

Figure 2:
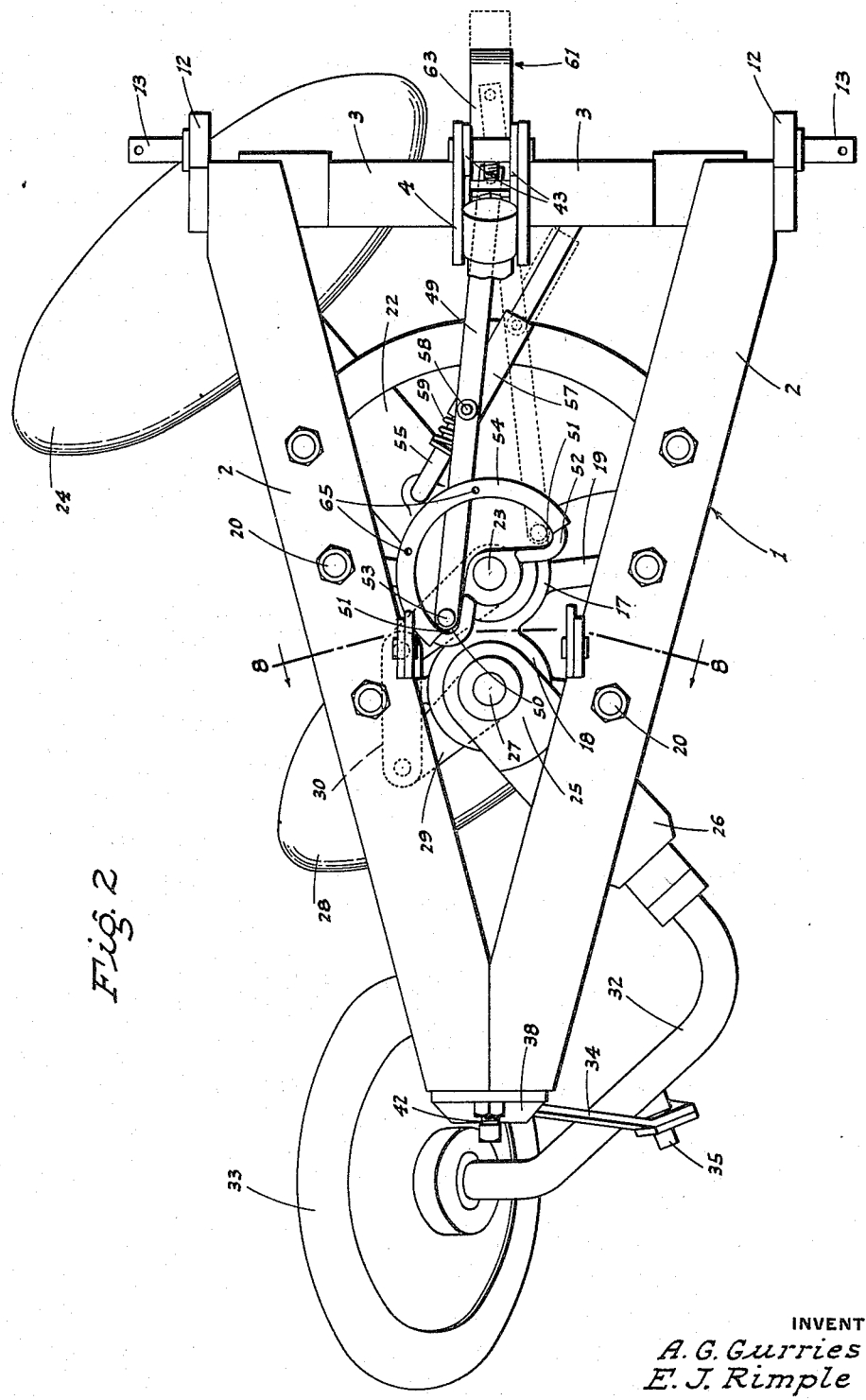
Fig. 2 is a similar view, but showing the discs and wheel just as reversed.

Journaled in standard 26 some distance above its lower end is a horizontal spindle 31 disposed at right angles to the transverse median line of disc 28 and whose axis extended intersects the extended axis of spindle 27, as shown at point P in Fig. 7. Depending from the rear end of the spindle is a standard 32 which projects at a lateral angle toward the side of the plow which the discs face, as shown in Figs. 1 and 2, and a furrow wheel 33, angled as usual relative to a vertical longitudinal plane, is mounted on the lower end of the standard 32.

A link 34 extends upwardly from a pivot pin 35 on the rear side of standard 32; the axis of pin 35, if extended, intersecting point P (see Fig. 7).

The link, at its upper end, is adjustably clamped for depth control to a pivot pin 36 which may slidably and swivelly work—as determined by ground undulations—in a vertical slot 37 in an arm 38 depending from the rear end of beams 2 (see Fig. 7). The axis of pin 36 extended also substantially intersects point P. By reason of this arrangement, the standard may swing from side to side—or between right and left hand wheel positions—when the rear standard swings about the pin 27, without any binding of any of the parts on the pins and without the need of any relatively expensive ball and socket or similar joints being necessary. By adjusting the position of pivot pin 36 in the link 34, the effective length of said link can be altered. This in turn affects the normal angle at which the standard 32 is disposed which in turn alters the angles of setting of the furrow wheel 33 and the extent of penetration thereof into the ground, as will be evident. By reason of this feature, it has been found that the side draft of the plow can be altered and controlled.

By reason of the mounting of the discs and furrow wheel, as above described, it will be seen that when the discs are clear of the ground and thus not restrained by dirt contact, it is an easy and relatively effortless operation to swing the discs from one side and position to the other; swinging pressure applied to the front standard 22 being transmitted in the same direction to the rear standard 31 by reason of the arm and bar connection 29—30 so that the discs are reversed in position relative to the frame while remaining in the same spaced relation to each other whether the discs are disposed for right or left hand plowing.

This desirable feature is obtained by reason of the fact that the disc mounting standards are supported from separate longitudinally spaced spindles on the frame.

When the standards and discs have been swung halfway between their opposite plowing positions, the upper portions of the standards are longitudinally alined in the frame, as shown in Fig. 7. To assist in shifting the standards the rest of the way, to one side or the other, a compression spring 39 is mounted on a telescoping support 40 which extends lengthwise of frame 1; one end of the support being pivoted on the upper end of standard 26 just back of fork 25, as at 41, while the rear end of support 40 is swively engaged by a longitudinally adjustable anchor bolt 42 mounted in the arm 38. Said spring is thus in a position of maximum compression and the support 40 is in a dead center position when the standards are in a midway position.

As the standards swing to such midway position, the standard 32 hangs straight down since nothing interferes with rotation of the spindle 31 in standard 26, or with swinging of the link 34. The furrow wheel then lies with its transversely extending diameter in a horizontal plane, as shown in Fig. 5, and upon a further swing of the standard 26, the furrow wheel standard 32 is swung in the opposite direction from its original angled position; the link 34 then acting as a suspension element causing the standard 32 to assume the desired laterally angled position with the furrow wheel then at its proper angular relation to the ground.

The disc standards are automatically thus swung upon lifting of the frame 1 by the tractor-mounted draft bars by means of the following arrangement:

Turnably mounted on pin 15 at the sides of link 16 and between arms 3 are depending arms 43 connected as a rigid unit intermediate their ends by a cross web 44. At their lower end, the arms 43 support a cross pin 45 on which a block 46 is turnable; the upper face of the block being generally on a level with the upper flat face 47 of the forward upper portion of the fork 21 of the front disc standard 22.

Turnable on a vertical pin 48 in the block 46 is a rearwardly projecting push bar 49, the rear end portion of which rests on said flat face of the fork 21. The rear end 50 of the bar 49 is horizontally rounded and is adapted to alternately engage in arcuate recesses 51 disposed in opposed relation in a flange 52 upstanding from fork 21 at the back of flat face 47; the recesses facing forwardly and lying in a transverse plane parallel to the transverse median plane of disc 24. A pin 53 upstands from bar 49 at said end 50 thereof, and a retaining rail 54, concentric with pin 23, connects to and above the ends of flange 52, extnding over the bar 49 in the horizontal plane of the pin 53.

A forwardly extending rod 55 is swively mounted on the forward end of fork 21 at a level adjacent but below that of bar 49 (see Fig. 7). The rod 55 adjacent its forward end slides through the depending lip 56 of a forwardly projecting strip 57 under bar 49 and pivoted at its rear end thereon, as at 58. A compression spring 59 on the rod 55 extends between lip 56 and an abutment 60 on the rod back of the lip.

By reason of this arrangement, it will be seen, as shown in Fig. 1, that when the plow discs are in the right hand plowing position, the bar 49 is advanced, swinging arms 43 forwardly, as shown in Fig. 3. The bar 49 is swung toward the left so that end 50 of the bar engages in the left hand recess 51, by the action of the compressed spring 59.

Rearward swinging movement imparted to arms 43 will then cause bar 49 to push against the left hand side of flange 52, rotating the fork 21, standard 22, and plow disc 24, as well as the rear standard 26 and disc 28. As soon as the push of bar 49 has swung the standards beyond a longitudinally alined or dead center position, spring 39 acts to swing the connected standards the rest of the way to a left-hand plowing position of the discs, as shown in Fig. 2. At the same time, spring 59 is then acting on bar 49 tending to swing the same toward the right.

Then, when the rearward pressure on the arms 43 is relieved, said spring acts to shift the bar (and said arms 43) forwardly, and as soon as the forward movement clears bar 49 from the rear portion of flange 52, the spring shifts the bar to the right and so that the rear end 50 of bar 49 is then in position in the right hand recess 51, as shown in dotted lines in Fig. 2, ready for a subsequent rearward movement to reverse the plow discs. Forward movement of the bar 49 is limited, and said bar controlled in its movement, by engagement of the pin 53 with rail 54.

The arms 43 are swung rearwardly by the upper tractor ling 16 upon lifting of the structure by the draft bars 14 by means of a stop member 61 projecting forwardly from between arms 43 and pivoted at its upper end thereon, as at 62. Member 61 includes a forwardly and downwardly sloping top arm 63 normally clear of and, of course, below link 16; the angle of slope of arm 63 being adjustable by reason of an adjustment screw 64 threaded through web 44 and bearing against the back of member 61. The arm 63 is disposed relative to link 16 so that the plow structure may be lifted sufficient to clear the discs from the ground before the link 16— whose forward end is at a fixed level—engages the arm 63.

Upon further lifting of the plow structure, however, the link 16—which now assumes an ever increasing upward slope—engages and relatively presses downwardly and rearwardly on the arm 63, as shown in Fig. 6, thus swinging the arms 43 rearwardly with the results previously described.

If no reversing movement of the plow discs is desired after the discs have been once disposed in a certain plowing position, such movement may be prevented by placing a pin (not shown) through one or the other of a pair of holes 65 in rail 54 arranged so that pusher bar 49, after being in one position and having once functioned to shift the discs, cannot be shifted laterally from such position even though said bar is free to move lengthwise with such pin as a guide, as the plow structure is raised and lowered.

From the foregoing description it will be readily seen that there has been produced such a device as substantially fulfills the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. A reversible plow for use with a tractor having draft and lift links, said plow comprising a frame arranged for connection to the draft and lift links of the tractor, a plow standard depending from the frame, a plow disc on the lower end of the standard, means pivotally mounting the standard on the frame for rotation through a predetermined arc about a vertical axis whereby the disc may be moved between right and left hand plowing positions, means to so rotate the standard in one direction and then the other alternately through said arc, a furrow wheel, a standard for the furrow wheel having a horizontal upper end element turnable in the back of the plow standard whereby the furrow wheel standard may be swung to dispose the furrow wheel in right and left hand positions alternately, and means between the frame and furrow wheel standard to cause the latter to swing with the rotation of the plow standard so as to dispose the furrow wheel in a position corresponding to that occupied by the disc.

2. A reversible plow for use with a tractor having draft and lift links, said plow comprising a frame, means connecting the frame to the draft and lift links of a tractor for raising and lowering movement, front and rear longitudinally spaced vertical pivot elements mounted in the frame, a front plow standard including a rearwardly projecting upper end portion mounted on the front pivot element, a forwardly facing plow disc mounted on the lower forward face of the standard, a rear plow standard including a forwardly projecting upper end portion mounted on the rear pivot element, a forwardly facing plow disc mounted on the lower forward face of the rear standard, means connecting the upper portions of the standards for rotation of said standards in unison and in the same direction between right and left hand plowing positions of the discs, means to control the rotation of the standards between said positions, a furrow wheel, a standard for the furrow wheel, means pivoting the last named standard on the rear plow standard for swinging movement about a horizontal axis, the furrow wheel standard projecting at a lateral angle toward the side of the plow which said discs face, and means between the frame and the furrow wheel standard to cause the latter to assume a laterally extending position opposite its initial position upon rotation of said plow standard from one plowing position of the discs to the other whereby to correspondingly change the position of the furrow wheel.

3. A reversible plow for use with a tractor having draft and lift links, said plow comprising a frame adapted for connection to the draft and lift links of the tractor, a vertical pivot pin mounted in the frame, a plow standard having an upper horizontal portion extending radially of the pin and including a hub turnable about the axis of the pin, a forwardly facing disc on the lower end of the standard and whose transverse horizontal median line is at right angles to the vertical radial plane of said upper portion of the standard, means on the hub forming upstanding forwardly facing right and left hand recesses on opposite sides of the pin and lying in a transverse plane parallel to that of the median line of the disc, a push bar resting adjacent its rear end on the hub for engagement at its rear end in the recesses alternately, a depending arm unit at the forward end of the bar to the lower end of which arm unit the bar is swivelly connected, means pivoting the arm unit at its upper end on the frame for swinging movement in a vertical plane lengthwise of the frame, whereby the bar will be advanced and retracted upon rearward and forward swinging respectively of the arm unit, and spring means between the standard and bar holding the rear end of the latter adjacent and in position to engage the left hand recess when said upper portion of the standard is angled toward the right side and also functioning, after the bar has been advanced by the rearward swing of the arm unit, to retract the bar and to swing the same laterally so that its rear end alines with the right hand recess.

4. A structure as in claim 3, with a guard rail above the hub and bar and fixed concentric with the hub in front of the pin and extending to said recess-forming means radially out from said recess-forming means and an upstanding pin on the bar at its rear end to engage against the inner periphery of the rail as the bar is swung laterally from one side to the other.

5. A structure as in claim 3, with a guard rail above the hub and bar and fixed concentric with the hub in front of the pin, said rail being provided with stop-pin locating orifices arranged so that when depending pins are in said orifices, the bar cannot swing laterally from an alined position with one or the other of the recesses.

6. A structure as in claim 3, in which said spring means comprises a rod swivelly mounted at its rear end in said upper portion of the standard ahead of the hub and extending forwardly, a member pivoted at its rear end on the underside of the bar intermediate its ends and extending forwardly, a lip depending from the forward end of said member and through which the rod is slidable, an abutment on the rod rearwardly of the lip, and a compression spring on the rod between the lip and abutment.

7. A structure as in claim 3, in which the plow standard is swingable between right and left hand plowing positions of the plowing disc, with means between the frame and standard and including a spring, acting to shift the standard laterally in the direction of movement imparted thereto by the bar after the standard has thus been shifted by the bar slightly more than half-way between right and left hand positions.

8. A structure as in claim 3, the upper lift link of the tractor being vertically swingable and functioning as a thrust link, with a member projecting forwardly from and rigid with the arm unit in position to be engaged and pressed rearwardly by the upper lift link upon upwarding swinging of said link and lifting of the frame sufficient to withdraw the disc from the ground.

9. A structure as in claim 8, in which said link is pivoted in common with the arm unit and is disposed at a downward and forward slope after the disc is clear of the ground.

10. A structure as in claim 9, in which the upper face of the member is disposed at a forward and downward slope, and means mounting said member on the arm unit so that the slope of said face can be altered.

References Cited in the file of this patent

UNITED STATES PATENTS

| | | |
|---|---|---|
| 273,508 | Garst | March 6, 1883 |
| 480,077 | Eddy | Aug. 2, 1892 |
| 692,805 | Waterman | Feb. 4, 1902 |
| 801,711 | Collins | Oct. 10, 1905 |
| 1,529,042 | Teasley et al. | March 10, 1925 |
| 2,543,786 | Lindeman | March 6, 1951 |
| 2,578,942 | Onfrey | Dec. 18, 1951 |
| 2,648,267 | Pursche | Aug. 11, 1953 |

FOREIGN PATENTS

| | | |
|---|---|---|
| 103,299 | Australia | Feb. 18, 1938 |